FIG. 1  EFFECT OF ALKALINE PHOSPHATASE (FROM CALF INTESTINES) ON THE HYDROLYSIS OF $K_4P_2O_8$
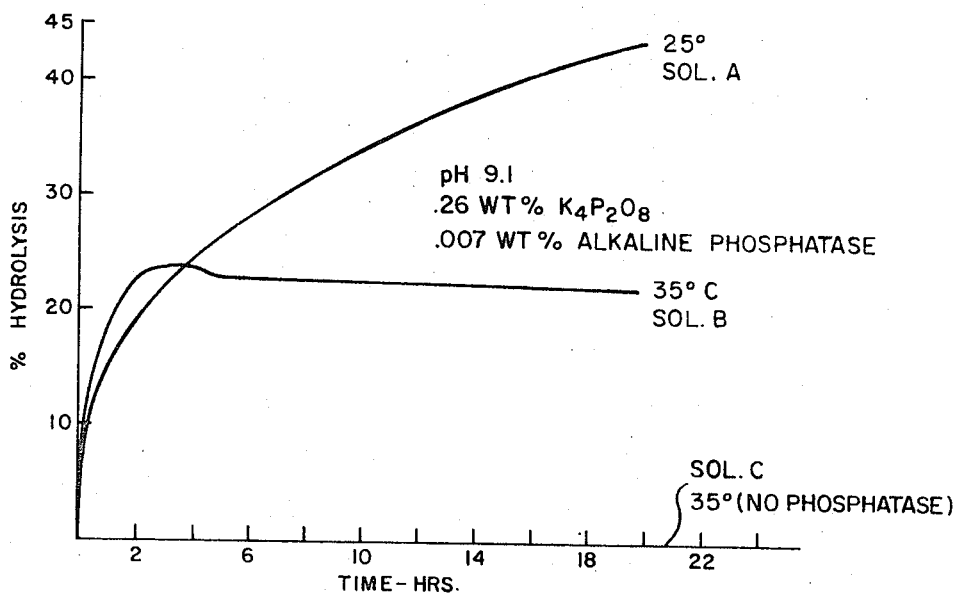
FIG. 2  EFFECT OF ACID PHOSPHATASE (FROM WHEAT GERM) ON THE HYDROLYSIS OF $K_4P_2O_8$ @ 25°C
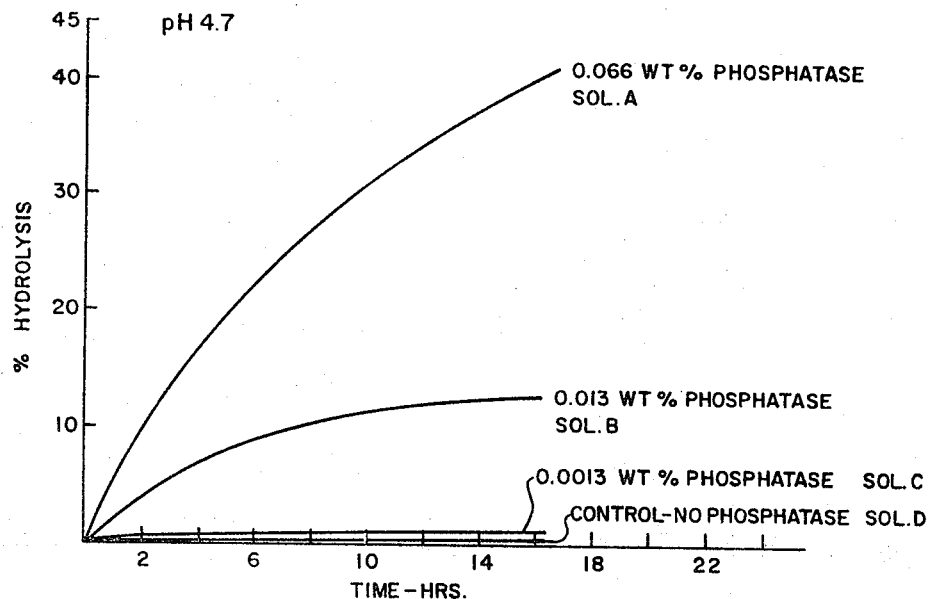
INVENTOR.
HARRY M. CASTRANTAS
BY PAULINE NEWMAN
EUGENE G. SEEMS
FRANK IANNO FIG. 3 EFFECT OF DIFFERENT $K_4P_2O_8$ CONCENTRATIONS ON HYDROLYSIS BY ACID PHOSPHATASE (FROM WHEAT GERM) @ 25°C AND pH 5.0
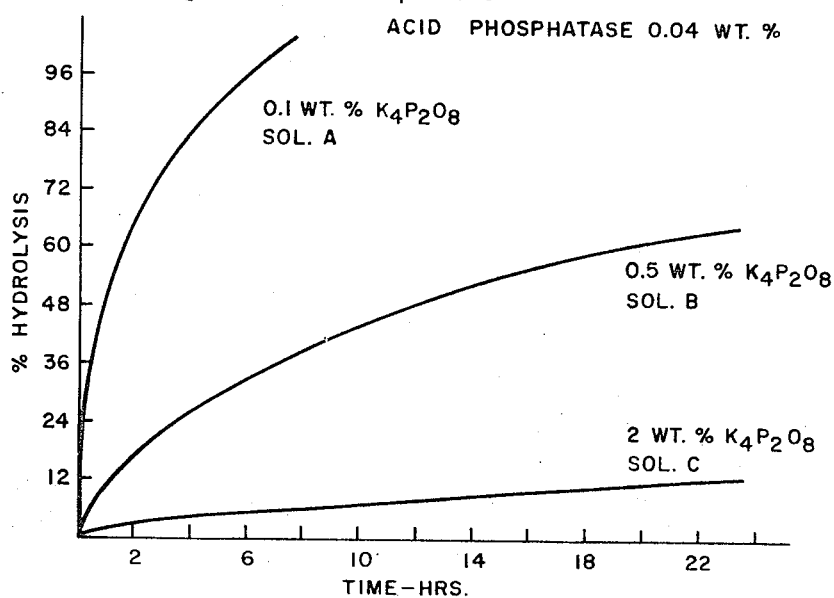
FIG. 4 EFFECT OF PHOSPHATASE-CONTAINING SUBSTANCES ON THE RATE OF PEROXYDIPHOSPHATE HYDROLYSIS @ 25°C AND pH 5.0
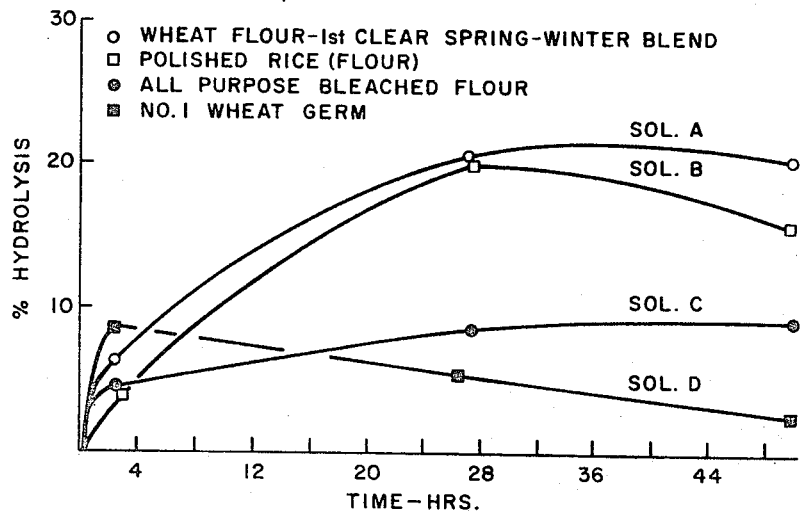
INVENTOR.
HARRY M. CASTRANTAS
BY PAULINE NEWMAN
EUGENE G. SEEMS
FRANK IANNO FIG. 5  EFFECT OF WHEAT FLOUR ON RATE OF PEROXYDIPHOSPHATE HYDROLYSIS IN AQUEOUS MIXTURES @ 25°C
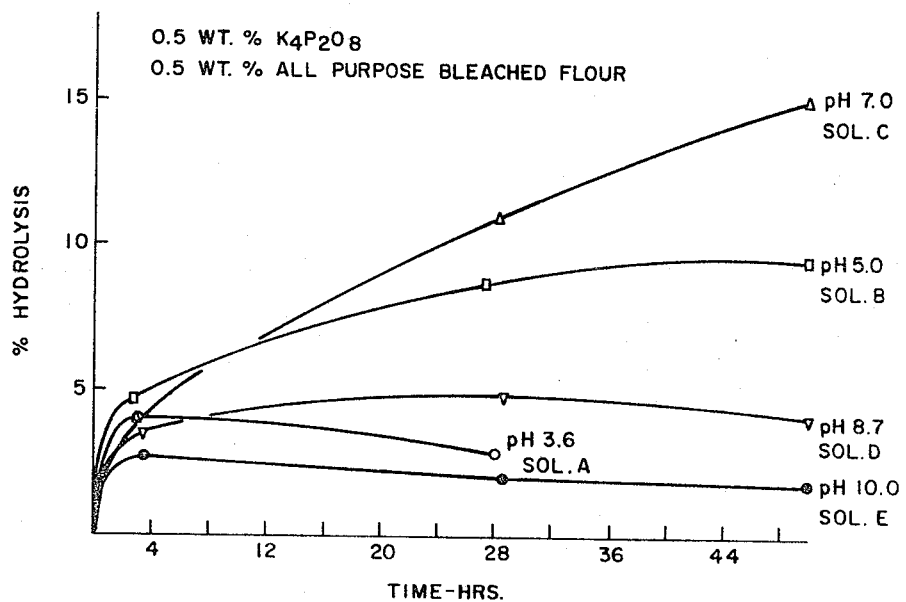
FIG. 6  COMPARISON BETWEEN PREFORMED PEROXYMONOPHOSPHATE & ENZYME INDUCED HYDROLYSIS OF $K_4P_2O_8$ USING WHEAT FLOUR AT 25°C AND pH 7.0.
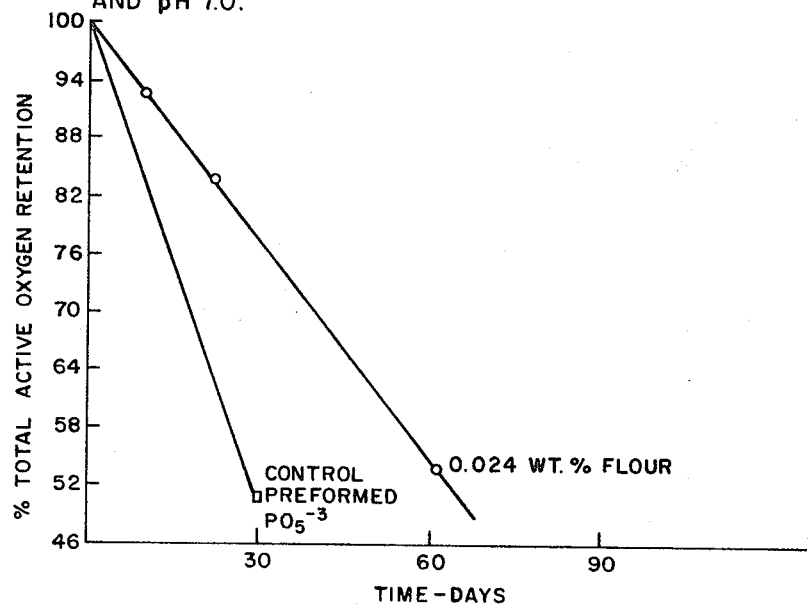
INVENTOR.
HARRY M. CASTRANTAS
BY PAULINE NEWMAN
EUGENE G. SEEMS
FRANK IANNO › # United States Patent Office 3,666,399
Patented May 30, 1972

3,666,399
ENZYMATIC PEROXYDIPHOSPHATE
HYDROLYSIS
Harry Marcus Castrantas, Trenton, N.J., assignor to
FMC Corporation, New York, N.Y.
Filed July 31, 1970, Ser. No. 60,003
Int. Cl. D06l 3/02
U.S. Cl. 8—111                                  7 Claims

ABSTRACT OF THE DISCLOSURE

This invention provides a safe, controlled peroxymonophosphate-generating composition comprising peroxydiphosphate and a phosphatase enzyme-containing substance. The composition is used by addition of water, which causes peroxymonophosphate to be generated at a safe, controlled rate by the enzyme-induced hydrolysis of the peroxydiphosphate.

BACKGROUND OF THE INVENTION (A) Field of the invention

Peroxymonophosphates are known to be useful in germicidal, bleaching, dyeing and metal detoxication processes. This invention provides a means for generating peroxymonophosphates in a new and useful way.

(B) Description of the prior art

Peroxymonophosphates, $(PO_5)^\equiv$ are produced by two methods. In perhaps the principal prior method, phosphorous pentoxide is reacted with aqueous hydrogen peroxide. This process proceeds very vigorously and is hazardous. In addition, the reactant phosphorous pentoxide is very hygroscopic and therefore present serious handling and storing problems. The peroxymonophosphate obtained by this prior art process contains polyphosphoric acid as an impurity and the yield from the process is generally poor.

Peroxymonophosphate has also been produced by acidifying peroxydiphosphate

This method permits the controlled generation of peroxymonophosphate in a solution; however, strong acidic conditions (pH values below 3) are required for reasonable and controlled rates. Although the pH can be adjusted upwardly after hydrolysis, this requires an additional process step which is not desirable. These difficulties limit use of the acidification process.

SUMMARY OF THE INVENTION

I have discovered that peroxymonophosphate ion can be generated at controllable rates by enzymatic hydrolysis of peroxydiphosphates, and have provided a composition and process employing this discovery. The composition comprises a peroxydiphosphate and a phosphatase enzyme which can be present in a phosphatase enzyme-containing substance if desired; and the composition is used in my new process by contacting it with water, which activates the enzymatic hydrolysis. The hydrolysis is non-violent and controllable to provide high yields of peroxymonophosphate over a wide pH range, by the proper selection of the phosphatase enzyme, its concentration and the process temperature. This unique controlled generation of the active peracid, peroxymonophosphate, has substantial advantages over preformed peroxymonophosphate in bleaching and germcidal processes.

BRIEF DESCRIPTION OF THE DRAWINGS

The drawings graphically depict the effect of various phosphatase enzymes on the hydrolysis of peroxydiphosphates at different enzyme concentrations, temperatures, pH values, and peroxydiphosphate concentrations.

DETAILED DESCRIPTION OF THE INVENTION

The controlled enzymatic hydrolysis of peroxydiphosphates takes place in an aqueous environment under proper conditions of temperature, peroxydiphosphate concentration, phosphatase/peroxydiphosphate ratio, pH, and time. Previously, it was not known how to control the hydrolysis of peroxydiphosphates except by acidification at a strongly acidic pH of about 3.

The reactants consist of a peroxydiphosphate, a phosphatase enzyme or phosphatase enzyme-containing substance and water. The operating temperature is between 0° C. and 50° C., although ambient temperatures, 20 to 30° C., is preferred.

Any of the peroxydiphosphates or their corresponding acid salts that are water soluble to the extent of about 0.001 weight percent can be used in the composition of this invention. Examples of these are potassium peroxydiphosphate $(K_4P_2O_8)$, lithium peroxydiphosphate $$(Li_4P_2O_8)$$

sodium peroxydiphosphate $(Na_4P_2O_8)$, ammonium peroxydiphosphate $((NH_4)_4P_2O_8)$, tripotassium monosodium peroxydiphosphate $(K_3NaP_2O_8)$, dipotassiun disodium peroxydiphosphate $(K_2Na_2P_2O_8 \cdot 2H_2O)$, monopotassium trisodium peroxydiphosphate $(KNa_3P_2O_8)$, monoammonium tripotassium peroxydiphosphate $(K_3(NH_4)P_2O_8)$, diammonium dipotassium peroxydiphosphate $$(K_2(NH_4)_2P_2O_8 \cdot 2H_2O)$$

triammonium monopotassium peroxydiphosphate $$(K(NH_4)_3P_2O_8 \cdot 2H_2O)$$

monoammonium trisodium peroxydiphosphate $$(NH_4Na_3P_2O_8)$$

diammonium disodium peroxydiphosphate $$((NH_4)_2Na_2P_2O_8)$$

triammonium monosodium peroxydiphosphate $$((NH_4)_3NaP_2O_8)$$

monopotassium monosodium dihydrogen peroxydiphosphate $(KNaH_2P_2O_8)$, monoammonium monopotassium dihydrogen peroxydiphosphate $(K(NH_4)H_2P_2O_8)$, monoammonium monosodium dihydrogen peroxydiphosphate $(Na(NH_4)H_2P_2O_8)$, trilithium monopotassium peroxydiphosphate $(Li_3KP_2O_8)$, dilithium dipotassium peroxydiphosphate $(Li_2K_2P_2O_8)$, monolithium tripotassium peroxydiphosphate $(LiK_3P_2O_8)$, trilithium monosodium peroxydiphosphate $(Li_3NaP_2O_8)$, dilithium disodium peroxydiphosphate $(Li_2Na_2P_2O_8)$, monolithium trisodium peroxydiphosphate $(LiNa_3P_2O_8)$, triammonium monolithium peroxydiphosphate $((NH_4)_3LiP_2O_8)$, diammonium dilithium peroxydiphosphate $((NH_4)_2Li_2P_2O_8)$, monodiammonium trilithium peroxydiphosphate $((NH_4)Li_3P_2O_8)$, monolithium monosodium dihydrogen peroxydiphosphate $(LiNaH_2P_2O_8)$, monoammonium monolithium dihydrogen peroxydiphosphate $$((NH_4)LiH_2P_2O_8),$$

monolithium monopotassium dihydrogen peroxydiphosphate $(LiKH_2P_2O_8)$, and the acid salts of group 2 metals such as barium dihydrogen peroxydiphosphate $$(BaH_2P_2O_8)$$

and salcium dihydrogen peroxydiphosphate $(CaH_2P_2O_8)$.

The peroxymonophosphate which is produced by the hydrolysis gradually hydrolyzes to produce hydrogen peroxide, which supplements the activity of the peroxymonophosphate in such applications as bleaching and germicidal applications. All the analyses given herein report the total amount of active-peroxygen products of the hydrolysis and includes the small amount of hydrogen peroxide which results from this hydrolysis, that is from essentially none to as much as 15 to 20%.

Phosphatase enzymes are divided into two classifications, the acid and the alkaline. I have found that both the acid and the alkaline phosphatase enzymes are active in hydrolyzing peroxydiphosphate, and therefore both can be used in practicing this invention. Phosphatase enzymes that have been derived from a phosphatase enzyme-containing substance, or the phosphatase enzyme-containing substances themselves without any purification, can be used in this invention as the source of the phosphatase enzyme. However, the degree of purity of the phosphatase enzyme affects the quantity needed to obtain a specific hydrolysis rate. Acid phosphatase-containing substances that can be used in this invention include wheat flour, wheat germ, rice, barley, potatoes and regular household all-purpose bleached flour. Alkaline phosphatase-containing substances that can be used include intestinal mucosa and liver cortex.

The hydrolysis rate and the yield of peroxymonophosphate are regulated by adjusting the peroxydiphosphate concentration, the phosphatase/peroxydiphosphate ratio, the purity of the phosphatase and the temperature. By the proper regulation of these conditions, slow, controlled release of peroxymonophosphate over several hours or weeks can be obtained readily. The concentration of the peroxydiphosphate and the phosphatase/peroxydiphosphate ratio can be varied greatly depending upon the application. The minimum amount of phosphatase enzyme needed to activate the hydrolysis of peroxydiphosphates is 0.0004 part of phosphatase enzyme by weight per part of peroxydiphosphate, for an enzyme having an activity of 6 units per milligram. (A phosphatase activity unit is defined as that amount of enzyme required to release one micromole of phenol from p-nitro phenyl phosphate at 37° C.) There is no maximum limit on the proportion of enzyme in the combination of this invention, other than a practical economic one. Use of more enzyme generally increases the rate of hydrolysis.

The minimum concentration of peroxydiphosphate in solution depends upon the application. In germicidal applications, there should be at least 0.1 weight percent of peroxydiphosphate in the water-phosphatase solution. In bleaching operations, there should be at least 0.02 weight percent of peroxydiphosphate in the water-phosphatase solution. Hydrolysis of the peroxydiphosphate takes place at concentrations as low as 0.001 weight percent peroxydiphosphate in solution, which is sufficient for some applications.

When bleaching is the application, the preferred concentration of peroxydiphosphate is about 1 to 5 weight percent of the total solution and the preferred weight ratio of phosphatase enzyme to peroxydiphosphate is between 1/100 and 1/300. For germicidal processes, the preferred concentration of peroxydiphosphate is about 0.1 to 1 weight percent of the total solution and the preferred weight ratio of phosphatase enzyme to peroxydiphosphate is between 1/100 and 1/300.

The optimum pH for the hydrolysis depends upon the specific phosphatase enzyme used. In general, acid phosphatases are most active between pH 4 and 7, and alkaline phosphatases between pH 8 and 10. However, both are quite active over much wider pH ranges of 3.5 to 10 for acid phosphatase and 7 to 11 for alkaline phosphatase.

Many germicidal, bleaching, dyeing and metal detoxication applications of peroxymonophosphate are much more effective when the generation of the peroxymonophosphate can be safely regulated over prolonged periods, as is accomplished in accordance with this invention. In bleaching and germicidal processes particularly, the slow controlled generation of peroxymonophosphate over prolonged periods is especially valuable and was previously unattainable because the only method known to accomplish this was by acid hydrolysis of peroxydiphosphate at strongly acidic conditions that cause side effects which rendered the process unsuitable for use.

In bleaching processes, the controlled generation of peroxymonophosphate permits the optimum concentration of peroxymonophosphate to be maintained throughout the process even when prolonged bleaching is desired. This can be accomplished by adjusting the rate at which peroxymonophosphate is generated to approximately equal the rate at which peroxymonophosphate is dissipated during bleaching, thereby maintaining the peroxymonophosphate concentration consistently at the optimum value. The addition of the total quantity of peroxymonophosphate at the start of the bleaching process as practiced heretofore, resulted in a deleterious environment for many materials. The prior art acidification method of generating peroxymonophosphate also resulted in a deleterious environment because of the strongly acidic solution required for reasonable hydrolysis rates.

In germicidal processes, it has been found that the controlled generation of peroxymonophosphate by the process of this invention can kill organisims including *Staphylococcus aureus* (gram-positive coccus) and *Salmonella typhosa* (gram-negative bacillus). The ability to kill these bacteria demonstrates that the solutions produced by this invention, with the controlled generation of peroxymonophosphate, possesses potent anti-bacterial properties.

The safe, controlled generation of peroxymonophosphate does not occur until all three ingredients are present, namely, peroxydiphosphate, phosphatase enzyme and water. When only two of the ingredients, peroxymonophosphate and phosphatase enzyme, are combined the active oxygen germicidal agent peroxymonophosphate is not generated. Many germicidal applications do not require antiseptic activity until moisture is present. In such applications the peroxydiphosphate and phosphatase enzyme are mixed when dry and when the moisture becomes present during use, the antiseptic agent is automatically generated. By this means the retention of the active oxygen germicidal agent is maximized because it is generated when needed. For example, if dry peroxydiphosphate and phosphatase enzyme are added to a dry baby powder formulation, then the germicidal agent (peroxymonophosphate) is not generated because no moisture is present. Upon use of the baby powder, the areas that are wet automatically are subjected to antiseptic activity because of the addition of water to the combination. However, the antiseptic activity remains dormant on those areas of application that are dry.

Other specific germicidal applications for the controlled peroxymonophosphate generation provided by this invention include latex paint formulations, plant seed protection, cosmetic preparations, flour milling, bar soaps, detergents, shampoos, deodorants, toothpaste, food preservation, anti-infective agents and industrial biocide applications, e.g. cutting oils and secondary oil well recovery.

For seed storage applications, simply coating phosphatase-containing seeds (e.g. barley, wheat, rice) with a peroxydiphosphate solution or powder induces the generation of peroxymonophosphate (especially under conditions of high humidity) to reduce the number of disease organisms. In addition, the peroxymonophosphate, by-product, $PO_4^{\equiv}$, provides a built-in fertilizer for seeds that are to be planted.

In paint applications, bacteria and fungi have been known to interfere with the shelf life and adhesion properties of latex paints. The incorporation of a peroxydiphosphate and a small amount of phsophatase enzyme or phosphatase enzyme-containing substance generates peroxymonophosphate for periods of up to several months and hence is useful in reducing the organism population and increasing the shelf life of the paint.

In flour milling, the process of this invention leads to improved bleaching and/or maturing of the flour.

The use of peroxydiphosphate-phosphatase mixtures in cooling water towers provides sustained release of peroxymonophosphate to reduce the number of organisms.

Incorporation of peroxydiphosphate-phosphatase mixtures in aqueous sprays for hospital use, greatly reduces the bacterial population of the treated areas for prolonged periods.

Incorporation of a phosphatase-peroxydiphosphate mixture into bar soap provides an outer coating of peroxymonophosphate upon wetting the soap. The bacterial count of the bar soap thereby is held at a minimum and the peroxymonophosphate functions to reduce skin bacterial counts.

Bleaching applications for peroxydiphosphate-phosphatase combinations include in addition to fiber bleaching, hair bleaching, denture cleaner formulations, laundry presoaks, and bleaching of fats, oils and waxes.

FIGS. 1 through the 6 show the effect of the variables of this invention upon the hydrolysis rate.

FIG. 1 shows the effect of an alkaline phosphatase enzyme derived from calf intestine, on the hydrolysis of potassium peroxydiphosphate at pH 9.1. The data shown in FIG. 1 was obtained as described in Example 1.

FIG. 2 shows the effect of an acid phosphatase enzyme derived from wheat germ on the hydrolysis of potassium peroxydiphosphate at different phosphatase/peroxydiphosphate ratios. The data shown in FIG. 2 was obtained as described in Example 2.

FIG. 3 shows how varying the peroxydiphosphate concentration affects the hydrolysis of peroxydiphosphate with an acid phosphatase (from wheat germ). The data shown in FIG. 3 was obtained as described in Example 3.

FIG. 4 shows how different types of acid phosphatase enzyme-containing substances affect the hydrolysis. The data shown in FIG. 4 was obtained as described in Example 4.

FIG. 5 shows the effect of various pH values upon the hydrolysis of peroxydiphosphate with an acid phosphatase enzyme-containing substance (wheat flour). This figure shows that the preferred pH value for this wheat flour is between 5 and 7, and that the hydrolysis with an acid phosphatase takes place in moderately acid and moderately basic solutions. The data shown in FIG. 5 was obtained as described in Example 5.

FIG. 6 shows the peroxygen life of peroxymonophosphate produced by the controlled generation method of this invention as compared with preformed peroxymonophosphate. The data for this comparison between preformed peroxymonophosphate and generated peroxymonophosphate was obtained under ideal conditions for the preformed peroxymonophosphate. Under normal conditions, e.g. when normal impurities are present in the water, the substantial advantage of generated over preformed peroxymonophosphate is more pronounced. The data shown in Example 6 was obtained as described in Example 6.

Reference to FIGS. 1 to 6 enables one skilled in the art to determine for his particular application the type of phosphatase enzyme-containing substance to use, its concentration, and the concentration of peroxydiphosphate required.

The environmental characteristics of each application determine the pH range, the level and the duration of activity required for the peroxymonophosphate generating solution. For example, in bleaching cotton fabrics as in a pre-soak process, a pH range of 9 to 10 is preferred and it is preferred that the level of hydrolysis quickly reach a maximum and remain close to that maximum value for the duration of the bleaching, usually overnight. With these preferred operating conditions for pre-soak bleaching applications in mind, reference to FIGS. 1 to 6 indicates the selection of specific phosphatase enzyme and peroxydiphosphate concentration that satisfies these preferred operating conditions.

The following examples are provided for illustration only and are not intended to limit the scope of the invention.

EXAMPLE 1

Three solutions (A, B and C) were prepared, each containing 0.26 grams of potassium peroxydiphosphate ($K_4P_2O_8$) and 100 grams of distilled water. The pH value of the solution was 9.1. To each of solutions A and B was added 0.007 gram of an alkaline phosphatase enzyme derived from calf intestines. The alkaline phosphatase was omitted from comparative solution C. Solution A was maintained at 25° C. and solutions B and C were maintained at 35° C. Periodically aliquots of each solution were titrated for peroxymonophosphate anion following the procedure of M. M. Crutchfield, The Acidity, Complexes, Hydrolysis and Decomposition of Peroxydiphosphate and Its Salts, June 1960 (Thesis in Brown University Library). The results are shown in FIG. 1, and demonstrate that in the absence of the phosphatase enzyme, no peroxymonophosphate was formed while with alkaline phosphatase enzyme present, peroxymonophosphate formed at different rates, depending upon temperature.

EXAMPLE 2

Four solutions (A, B, C and D) were prepared, each containing 0.5 gram of potassium peroxydiphosphate ($K_4P_2O_8$) and 100 grams of distilled water. The pH values of the solutions were adjusted to 4.7 with a sodium acetate, acetic acid buffer. An acid phosphatase enzyme derived from wheat germ was added to solutions A, B, and C, but not to comparative solution D. The amount of enzyme added to solution A equaled 0.066 weight percent of the solution. The amount of enzyme added to solution B was one-fifth of the amount added to solution A (0.013 weight percent). The amount of enzyme added to solution C was one-fiftieth of the amount added to A (0.0013 weight percent). Aliquots from each solution were periodically withdrawn and analyzed for peroxymonophosphate anion following the procedure used in Example 1. The temperature was maintained at 25° C. The results are shown in FIG. 2 and show that increasing the phosphatase ratio increases the rate of formation of peroxymonophosphate.

EXAMPLE 3

Three aqueous solutions (A, B and C) were prepared, containing 0.1, 0.5 and 2.0 grams of potassium peroxydiphosphate respectively per 100 ml. of solution. To each solution was added 0.04 gram of an acid phosphatase enzyme derived from wheat germ and the pH of the solution was adjusted to 5 with sodium acetate buffer. The solutions were maintained at 25° C. and aliquots from each solution were periodically withdrawn and analyzed following the procedure used in Example 1. The results are shown in FIG. 3.

EXAMPLE 4

Four 100 ml. aqueous solutions (A, B, C and D) were prepared each containing 0.5 gram of an acid phosphatase enzyme-containing substance; wheat flour, 1st clear springwinter blend, polished rice (flour), all purpose bleached flour and No. 1 wheat germ respectively. To each solution was added 0.5 gram of potassium peroxydiphosphate. The pH of the solution was adjusted to 5 with a sodium acetate buffer. The temperature was maintained at 25° C. and aliquots from each solution were periodically withdrawn and analyzed following the procedure used in Example 1. The results are shown in FIG. 4.

EXAMPLE 5

Five solutions were prepared (A through E), each containing 0.5 weight percent potassium peroxydiphosphate in distilled water. To each solution was added 0.5 weight percent of all-purpose bleached wheat flour (household flour) which is an acid phosphatase enzyme-containing substance. The pH value of each solution was adjusted to different values so that the pH of solution A was 3.6, pH of solution B was 5.0, pH of solution C was 7.0, pH of solution D was 8.7, and the pH of solution E was 10.0. The solutions were maintained at 25° C. and aliquots from each solution were periodically withdrawn and analyzed for peroxymonophosphate anion following the procedure used in Example 1. The results are shown in FIG. 5.

EXAMPLE 6

A 100 ml. aqueous solution was prepared containing 0.5 gram of potassium peroxydiphosphate and 0.024 gram of all-purpose bleached flour. The pH of the solution was adjusted to 7 with ortho phosphoric acid and the temperature was maintained at 25° C. Periodically, analyses for total active oxygen was carried out using a ferrous ammonium sulfate-ceric sulfate titrimetic procedure. The results are shown in FIG. 6 in comparision with the known half-life for peroxymonophosphate in pure water.

EXAMPLE 7

Bacteria, *Staphylococcus aureus* and *Salmonella typhosa* were subjected to five consecutive 24-hour passages on FDA nutrient agar (incubated at 37° C.) and were collected by suspension in 10 ml. of sterile saline. The bacteria suspensions were diluted to contain a standard concentration of approximately $10^6$ organisms per ml. The levels were established by spectrophotometer and plate counts. Suspensions were stored at 0–4° C.

A first test agent was prepared as follows. To 99.44 ml. of sterile, deionized, distilled water was added 0.50 gram of potassium peroxydiphosphate and 0.06 gram of acid phosphatase enzyme derived from wheat germ grade B. The pH of the system was adjusted to 5.5 with 10% sodium acetate (anhydrous)-acetic acid buffer (pH 4.7). The reaction vessel was left at room temperature for 18 hours before use to permit hydrolysis to peroxymonophosphate. Upon completion of the hydrolysis (18 hours), a quantity of the first test agent was removed and diluted 1:10 to provide a second test agent for *Staphylococcus aureus*. A third test agent was prepared identical in all respects to the first except containing no enzyme and it was held for 18 hours at room temperature.

The protocol was as follows:

(1) Saline Control: To 5 ml. of saline containing 200,000 organisms per ml. was added 5 ml. of saline. Final concentration of organisms was 100,000/ml.

(2) Potassium Peroxydiphosphate Control: To 5 ml. of saline containing 200,000 organisms per ml. was added 5 ml. of the compound untreated with enzyme. Final concentration of organisms was 100,000/ml.

(3) Test: To separate samples of 5 ml. of saline solution containing 200,000 organisms/ml. in a reaction tube was added 5 ml. of the first, second and third test agents respectively to form corresponding first, second and third test mixtures. The concentration of the first test mixture was 100,000 organisms/ml., 2500 p.p.m. of peroxydiphosphate before hydrolysis and 300 p.p.m. enzyme. The concentration of the second test mixture was 100,000 organisms/ml., 250 p.p.m. of peroxydiphosphate before hydrolysis and 30 p.p.m. enzyme. The concentrate of the third test mixture was 100,000 organisms/ml., 2,500 p.p.m. peroxydiphosphate and no enzyme.

All tubes were incubated at room temperature for 1 hour.

Duplicate one ml. samples of the contents of each tube were placed on petri plates. The remaining contents of each tube was diluted in sterile saline from 1:10 through 1:10,000. Duplicate one ml. samples of each of the several dilutions were then placed on petri plates. Melted nutrient agar was added to the plates containing the bacteria.

The bacteria on the petri plates were incubated for 48 hours at 37° C., following which colony counts were made. The colony counts presented in Table 1 represent an average of 2 plates per dilution and several dilutions. The enzyme-treated peroxydiphosphates compound is effective against both bacteria, but particularly *Salmonella typhosa*.

TABLE 1.—EFFECT OF ACID PHOSPHATASE-TREATED POTASSIUM PEROXYDIPHOSPHATE ON BACTERIA

| Sample | Plate counts, colonies per ml. | |
|---|---|---|
| | S. aureus | S. typhosa |
| Saline control | 89,000 | 167,000 |
| $K_4P_2O_8$ Control (third test mixture) | 215,000 | 259,000 |
| $K_4P_2O_8$ plus enzyme: | | |
| 2,500 p.p.m. (first test mixture) | 300 | 0 |
| 250 p.p.m. (second test mixture) | 900 | |

EXAMPLE 8

A tea stained cotton cloth was treated by immersing it in a freshly prepared solution containing 0.5 gram of potassium peroxydiphosphate and 0.013 gram of alkaline phosphatase enzyme derived from calf intestine. The pH value was adjusted to 9. After 17 hours at 25° C. the cloth was removed and air dried. The same procedure was followed with a comparative solution and stained cloth except that the solution did not contain any alkaline phosphatase enzyme. The transmittance of the solution at 500 millimicrons (mu) and the reflectance of the bleached cloth were determined after treatment. The results are reported in the following table.

TABLE 2.—BLEACHING OF TEA STAINED CLOTH

| | 17 hours at 25° C. | |
|---|---|---|
| | $K_4P_2O_8$ | $K_4P_2O_8$ plus alkaline phosphatase |
| Solution, percent: Transmittance 500 mu | 42.5 | 58.0 |
| Hunter Reflectometer: Reflectance (blue light) | 32.5 | 43.4 |

I claim:

1. A composition capable of generating peroxymonophosphate ion by addition of water, comprising a peroxydiphosphate and an amount of a phosphatase enzyme to provide an activity at least equivalent to the activity provided by an enzyme having an activity of six units per milligram and present in an amount of 0.0004 part by weight per part of peroxydiphosphate.

2. The composition of claim 1 in which the phosphatase enzyme is an acid phosphatase enzyme.

3. The composition of claim 1 in which the phosphatase enzyme is an alkaline phosphatase enzyme.

4. The composition of claim 1 in which the phosphatase enzyme is present in a naturally-occurring phosphatase enzyme-containing substance.

5. The composition of claim 4 in which the phosphatase enzyme is contained in a flour selected from the group consisting of wheat flour, rice flour, barley flour, and potato flour.

6. A process for the safe, controlled generation of peroxymonophosphate ion comprising contacting with water, at least 0.001 weight percent based on said water of peroxydiphosphate and at least 0.0004 part by weight of a phosphatase enzyme per part of peroxydiphosphate, and maintaining the temperature between 0 and 50° C.

7. The process of claim 6, further comprising contacting an article to be bleached with said peroxymonophosphate ion.

References Cited
UNITED STATES PATENTS 2,077,103   4/1937   Franz _____ 8—111 X MAYER WEINBLATT, Primary Examiner U.S. Cl. X.R.

195—63, 68; 252—Dig. 12, 95, 186